PREVENTION OF CROSS-TALK IN VIDEO RECORDINGS

Filed June 5, 1962

INVENTOR
FRANCISCUS TH. BACKERS
JOHANNES H. WESSELS.
BY
AGENT 3,234,325
PREVENTION OF CROSS-TALK IN VIDEO RECORDINGS

Franciscus Theodorus Backers and Johannes Hendrik Wessels, Eindhoven, Netherlands, assignors to North American Philips Company, Inc., New York, N.Y., a corporation of Delaware Filed June 5, 1962, Ser. No. 200,272
Claims priority, application Netherlands, June 14, 1961, 265,960
5 Claims. (Cl. 178—6.6)

This invention relates to a method and apparatus for recording and reproducing magnetic recordings on a suitable carrier more specifically, it relates to the magnetic recording and reproduction of video signals containing image signals and synchronizing signals, the recording and reproduction being achieved by means of one or more magnetic heads which move relative to the carrier in a manner such that the recordings are recorded on, or reproduced from, relatively parallel tracks making an acute angle to the direction of length of the carrier; each track includes signals corresponding to at least one line-synchronizing pulse of the video-signal.

In known methods of the above kind the video-signal, frequency-modulated on a carrier wave, is recorded on the carrier by means of one or more rotary heads each of which has a plane of rotation which is at an acute angle to the direction of length of the carrier. The carrier has a comparatively low speed with respect to the said plane of rotation, for example a speed of 40 cm./sec.; the speed of the carrier with respect to these heads is, however, comparatively very high, for example, 40 m./sec. Such a high speed is desirable in view of the large bandwidth of the signal to be recorded. The signal to be recorded comprises the lower side-band of the carrier wave frequency-modulated by the video-signal. The frequency of the carrier wave may be, for example, 6 mc./sec. and the bandwidth of the video-signal is about 5 mc./sec. The said lower side-band extends generally from 1 mc./sec. to 6 mc./sec.

The video-information thus recorded is reproduced in a similar manner by means of one or more rotary heads. In the prior art, it is known to ensure by appropriate measures that the positions of the rotary heads with respect to the carrier are substantially the same during reproduction as during recording.

Despite these measures the heads have a tendency to deviate repeatedly from the correct position on the tracks during operation; this may result in a reproducing head receiving information from an adjacent track in addition to that from the correct associated track. This becomes manifest as an interfering wave pattern in the reproduced image reproduced and is generally known as cross-talk.

A similar effect occurs if the tracks are narrow with respect to the width of the heads and/or are too concentrated in a particular area. In this case the interference is more or less continuous.

A primary object of the invention is to considerably improve the method of recording and reproducing magnetic recordings of video signals and in particular to avoid the reproduction of signals from adjacent tracks. According to one aspect of the invention, the recording of the lines on the carrier is improved in that the recordings relating to the line-synchronizing pulses of the video-signal of all the tracks and in particular of all adjacent tracks on lines in the plane of the carrier extending at right angles to the direction of length of a track.

The invention is based upon recognition of the fact that the interfering action of cross-talk of information from one track to another is chiefly attributable to the cross-talk of information corresponding to the line-synchronizing signals from one track to the image information of the other track; the line-synchronizing signals extend far in the blacker than black-direction of the video-signal. This particular cross-talk is avoided by practicing the method according to the invention.

In addition to avoiding cross-talk, the invention has the following advantages, among others: the positions of the heads with respect to the carrier during reproduction relative to the positions during recording are less critical, and the tracks may be narrower and more concentrated per unit area.

In a device according to the invention for recording and reproducing magnetic recordings consisting of video-signal containing image signals and synchronizing signals and comprising one or more magnetic heads having a relative movement with respect to the carrier such that the recordings are recorded on, or reproduced from, relatively parallel tracks making an acute angle to the direction of length of the carrier, each track bearing recordings relating to at least one line-synchronizing pulse of the video-signal, the recording and reproducing elements are arranged so that the recordings of the line-synchronizing pulses of all the tracks and in particular of all the adjacent tracks are located on lines in the plane of the carrier extending at right angles to the direction of length of the tracks.

In order that the invention may be readily carried into effect, it will now be described in detail, by way of example, with reference to the accompanying diagrammatic drawing, in which.

Figure 1:
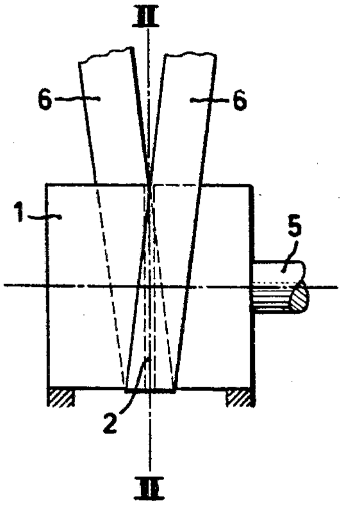
FIGURE 1 shows a device capable of carrying out the method according to the invention.
Figure 2:
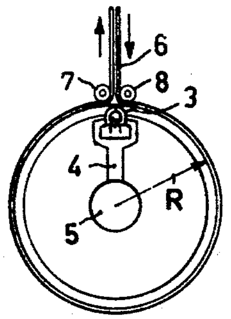
FIGURE 2 is a sectional view of the device of FIGURE 1, taken along the line II—II.
Figure 3:
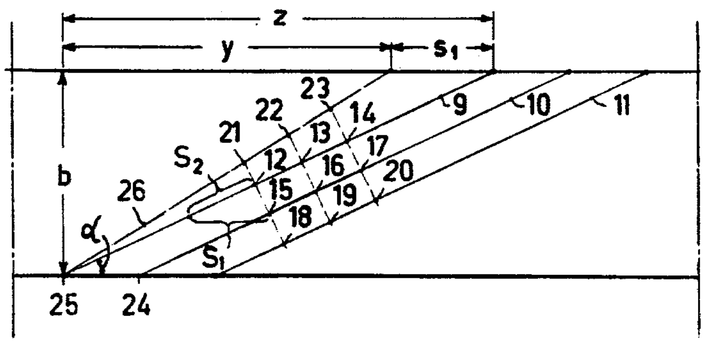
FIGURE 3 shows a portion of the carrier of FIGURES 1 and 2 on an enlarged scale.

FIGURES 1 and 2 show a stationary drum 1 provided with a slot 2 in which a video-head 3 is secured to an arm 4, the head and the arm being rotatable about a spindle 5. A magnetic tape 6 is wound helically on the drum 1 through an agle of almost 360° ground guide members 7 and 8 which are arranged at a small distance from each other. Tracks are recorded on the carrier by the video-head 3 and extend parallel to one another in an oblique direction. FIGURE 3 shows a portion of the tape on an enlarged scale. Reference numerals 9, 10 and 11 indicate three such tracks. A number of line periods separated from each other by line-synchronizing pulses are recorded on each track. The reference numerals 12 to 20 indicate a number of areas at which information relating to the line-synchronizing pulses is present on the tracks.

According to the invention measures are taken to ensure that the areas 15, 16 and 17 on track 10, the areas 12, 13 and 14 on track 9 and the areas 18, 19 and 20 on track 11 all lie respectively on the lines 21, 22 and 23 extending in the plane of the carrier at right angles to the direction of length of the tracks.

The conditions which a device as shown in FIGURES 1 and 2 must fulfill for obtaining the above results will be explained below.

It is assumed that video information has to be recorded the norm of which is such that an image is built up from an odd number of lines $2m+1$ ($m$ is an integer) and two interlaced partial images.

It is also assumed that the time of revolution $T_R$ of the spindle 5 of FIGURES 1 and 2 corresponds to the period of a partial image. This means that a whole partial image is recorded on a track, such a partial image containing $$\frac{2m+1}{2}$$

line periods. It is to be noted that such a track is not wholly recorded in practice because of the fact that the guide members 7 and 8 are positioned at a finite distance from each other.

If the area 15 is remote from the starting point 24 of track 10 by a distance $x \cdot d$. ($d$ is the travel distance of the head on a track during one line period and $x$ is an arbitrary number), the area 12 lies at a distance $(x+n+\frac{1}{2})d$ ($n$ is an integer) from the starting point 25 of track 9. Thus the distance indicated by $S_2$ in FIGURE 3 is $$\frac{2n+1}{2}\times d$$

The angle made by the tracks to the direction of length of the carrier is assumed to be $\alpha$.

The distance $S_1$ between two tracks in the direction of length of the carrier is then:

$$S_1=\frac{S_2}{\cos\alpha}=\frac{2n+1}{2}\cdot\frac{d}{\cos\alpha} \qquad (1)$$

If the speed of the carrier with respect to the plane of rotation of the head, as measured in the direction of length of the carrier, is indicated as $V_t$, then, since the time of revolution of the spindle 5 is equal to $T_r$:

$$S_1=V_t\cdot T_r \qquad (2)$$

If, furthermore, the speed of the head with respect to a track is indicated as $V_k$, then:

$$d=V_k\cdot\frac{2}{2m+1}\cdot T_r \qquad (3)$$

From (1), (2) and (3) it follows:

$$\frac{V_k}{V_t}=\frac{2m+1}{2n+1}\cdot\cos\alpha \qquad (4)$$

It will be proved that $V_k$ and $\alpha$ are functions of $V_t$. If the width of the portion of the carrier occupied by the tracks (if these tracks were recorded through the full 360° of the revolutions of the head 3) is indicated as $b$, then we have:

$$V_k=\frac{b}{T_r\sin\alpha} \qquad (5)$$

Furthermore $$\alpha \text{ arccotg } \frac{z}{b} \qquad (6)$$

wherein $z$ is the length of the projection of a track in the direction of length of the carrier.

From FIGURE 3 is also follows:

$$z=S_1+y$$

or $$z=V_t\cdot T_r+y$$

$y$ is the length of the projection of a "track" 26 in the direction of length of the carrier, which track 26 would be recorded if the carrier would not move with respect to the drum 1. The length of the track 26, if R is the length of the arm 4, is $2\pi R$. From this it follows:

$$z=\sqrt{4\pi^2R^2-b^2}+V_t\cdot T_r \qquad (7)$$

From (4) and (5) it follows that $V_t$ must satisfy the formula:

$$\frac{T_r}{2b}\cdot V_t\cdot\frac{2m+1}{2n+1}\cdot\sin 2\alpha=1$$

wherein $$\text{cotg }\alpha=\frac{\sqrt{4\pi^2R^2-b^2}+V_t\cdot T_r}{b}$$

The only magnitude in the last two formulas, with a given television norm and a given structure of the device, which is adjustable independently is $V_t$. By controlling this speed $V_t$ of the carrier with respect to the plane of motion of the head, in the direction of length of the carrier, it is thus seen that it may be ensured that the recordings of the line-synchronizing pulses of all the tracks are located on lines in the plane of the carrier extending at right angles to the direction of length of the tracks.

From the above relationships, it is seen that it is also possible to start from a given speed $V_t$ of the tape. In this case $b$ and R must be chosen so that the last two formulas are fulfilled.

While the invention has been described with respect to a specific embodiment, various changes and modifications may be made without departing from the inventive concept, the scope of which is set forth in the appended claims.

What is claimed is:

1. Apparatus for recording and/or reproducing video signals including video and line-synchronizing signals on a magnetic record carrier, comprising: at least one rotating magnetic head, a hollow stationary drum having a slot in the surface thereof, said head rotating in said drum in close proximity to said slot, a moving magnetic record carrier wound helically on said drum in the vicinity of said slot and magnetically co-acting with said head, the rotating head and the moving carrier thereby forming a plurality of parallel magnetic tracks on the carrier each of which includes at least one field of the video signal, said field containing a plurality of line-synchronizing signals, the carrier having a speed such that the areas at which the line-synchronizing signals of all the tracks are recorded are located on lines in the plane of the carrier extending at right angles to the direction of length of the tracks.

2. Apparatus for recording and/or reproducing video signals including video and line-synchronizing signals on a magnetic record carrier, comprising: at least one rotating magnetic head, a hollow stationary drum with a radius R having a slot in the surface thereof with the center of rotation at the axis of the drum, said head rotating in said drum in close proximity to said slot, a moving magnetic record carrier wound helically on said drum in the vicinity of said slot and magnetically co-acting with said head, the rotating head and the moving carrier thereby forming a plurality of parallel magnetic tracks on the carrier each of which includes at least one field of the video signal, said field containing a plurality of line-synchronizing signals, each track extending across a portion $b$ of the width of the carrier, the carrier speed, the radius R and the portion $b$ being such that the areas at which the line-synchronizing signals of all the tracks are recorded are located on lines in the plane of the carrier extending at right angles to the direction of length of the tracks.

3. Apparatus for recording and/or reproducing video signals including video and line-synchronizing signals on a magnetic record carrier, the video signal being built up from $2m+1$ lines where $m$ is an integer and two interlaced partial images, comprising: at least one rotating magnetic head, a stationary drum having a slot in the surface thereof, said head rotating in said drum in close proximity to said slot, a moving magnetic record carrier wound helically on said drum in the vicinity of said slot and magnetically co-acting with said head, the period of rotation of the head being equal to a partial image of period $T_r$ of the video signal, the rotating head and the moving carrier thereby forming a plurality of parallel magnetic tracks on the carrier each of which includes at least one field of the video signal, said field containing a plurality of line-synchronizing signals, said apparatus satisfying the condition:

$$\frac{Tr}{2b}\cdot V_t\cdot\frac{2m+1}{2n+1}\sin 2\alpha=1$$

wherein $\alpha$ is given by:

$$\cot\alpha=\frac{\sqrt{4\pi^2R^2-b^2}+V_t\cdot Tr}{b}$$

where R is the radius of the drum, $b$ is the width of the portion of the drum occupied by the tracks, $V_t$ is the speed of the carrier, and $n$ is an integer.

4. A magnetic record carrier for use in a device for recording or reproducing video signals including image signals and line-synchronizing signals, comprising: a plurality of parallel linear magnetic tracks on said carrier, each track extending in an oblique direction on the carrier and making an acute angle with an edge of the carrier, each track containing at least one field of a video signal, said field including image signals and a plurality of line-synchronizing signals, the areas at which the line-synchronizing signals of all the tracks are recorded being located on lines in the plane of the carrier extending at right angles to the direction of length of the tracks.

5. A magnetic record carrier for use in a device for recording or reproducing video signals including image signals and line-synchronizing signals, comprising: a plurality of parallel linear magnetic tracks on said carrier, each track extending in an oblique direction on the carrier and making an acute angle with an edge of the carrier, each track containing at least one field of a video signal, said field including image signals and a plurality of line-synchronizing signals, the area at which a line-synchronizing signal of a track is recorded being located on a line in the plane of the carrier extending at right angles to the direction of length of the tracks, the areas at which line-synchronizing signals of the other tracks are recorded also being located on said line.

References Cited by the Examiner

UNITED STATES PATENTS 2,965,708 12/1960 Witt ---------------- 178—6.6

OTHER REFERENCES

Video Tape Recording, Bernstein, J., John F. Rider Publishers, Inc., New York, 1960, p. 96.

DAVID G. REDINBAUGH, *Primary Examiner.*